(12) United States Patent
Babovka et al.

(10) Patent No.: US 11,794,910 B2
(45) Date of Patent: Oct. 24, 2023

(54) EMERGENCY PARACHUTE SYSTEM FOR RESCUE OF PERSONS, OR OF MANNED OR UNMANNED AERIAL VEHICLES

(71) Applicant: Milan Babovka, Liberec (CZ)

(72) Inventors: Milan Babovka, Liberec (CZ); Martin Dorotka, Mnichovo Hradiste (CZ)

(73) Assignee: Milan Babovka, Liberec (CZ)

(*) Notice: Subject to any disclaimer, the term of this patent is extended or adjusted under 35 U.S.C. 154(b) by 134 days.

(21) Appl. No.: 17/441,769

(22) PCT Filed: Mar. 28, 2020

(86) PCT No.: PCT/CZ2020/050016
§ 371 (c)(1),
(2) Date: Sep. 22, 2021

(87) PCT Pub. No.: WO2020/192808
PCT Pub. Date: Oct. 1, 2020

(65) Prior Publication Data
US 2022/0177143 A1 Jun. 9, 2022

(30) Foreign Application Priority Data
Mar. 28, 2019 (CZ) ................ CZ2019-193

(51) Int. Cl.
*B64D 17/80* (2006.01)
*B64D 17/06* (2006.01)
(Continued)

(52) U.S. Cl.
CPC ............ *B64D 17/80* (2013.01); *B64D 17/06* (2013.01); *B64D 17/40* (2013.01); *B64D 17/725* (2013.01)

(58) Field of Classification Search
CPC ........ B64D 17/06; B64D 17/40; B64D 17/80; B64D 17/725; B64D 17/02
See application file for complete search history.

(56) References Cited

U.S. PATENT DOCUMENTS

| 3,112,906 A | 12/1963 | Zeyher |
| 4,687,160 A | 8/1987 | Logemann |

(Continued)

FOREIGN PATENT DOCUMENTS

| CN | 104670502 A | 6/2015 |
| CN | 206885363 U | 1/2018 |

(Continued)

OTHER PUBLICATIONS

Machine Translation of CZ-2012258-A3, Straka J, Oct. 2013 (Year: 2013).*

(Continued)

*Primary Examiner* — Tien Q Dinh
*Assistant Examiner* — Katherine June Bolek
(74) *Attorney, Agent, or Firm* — Wood Herron & Evans LLP

(57) ABSTRACT

An emergency parachute system for rescue of persons or of manned or unmanned aerial vehicles includes a storage unit, which contains at least one cavity with an opening. The emergency parachute system further includes at least two parachutes, each of which contains a canopy, suspension lines, and a riser. The canopies of the at least two parachutes are folded separately and arranged in the cavity or cavities of the storage unit ejectably. The centers of the canopies are mutually interconnected by means of connection cords on the top side in order to stablize the system during flight.

15 Claims, 11 Drawing Sheets

(51) Int. Cl.
*B64D 17/40* (2006.01)
*B64D 17/72* (2006.01)

(56) References Cited

U.S. PATENT DOCUMENTS

| | | | |
|---|---|---|---|
| 5,836,544 A | 11/1998 | Gentile | |
| 6,705,572 B1 * | 3/2004 | Christopher | B64D 17/72 244/148 |
| 7,918,419 B2 * | 4/2011 | Rosenfield | B64G 1/641 244/150 |
| 10,464,681 B1 * | 11/2019 | Western | B64C 27/20 |
| 2002/0179774 A1 | 12/2002 | Lee et al. | |
| 2015/0102171 A1 * | 4/2015 | Reinpold | B64D 17/725 244/143 |

FOREIGN PATENT DOCUMENTS

| | | |
|---|---|---|
| CN | 208344535 U | 1/2019 |
| CZ | 2012258 A3 * | 10/2013 |
| EP | 3050805 A1 | 8/2016 |
| FR | 3038884 A1 | 1/2017 |
| GB | 1098379 A | 1/1968 |
| JP | 2013040744 A | 2/2013 |

OTHER PUBLICATIONS

European Patent Office; Search Report in related International Patent Application No. PCT/CZ2020/050016 dated Jul. 20, 2020; 3 pages.

* cited by examiner

Fig. 10A
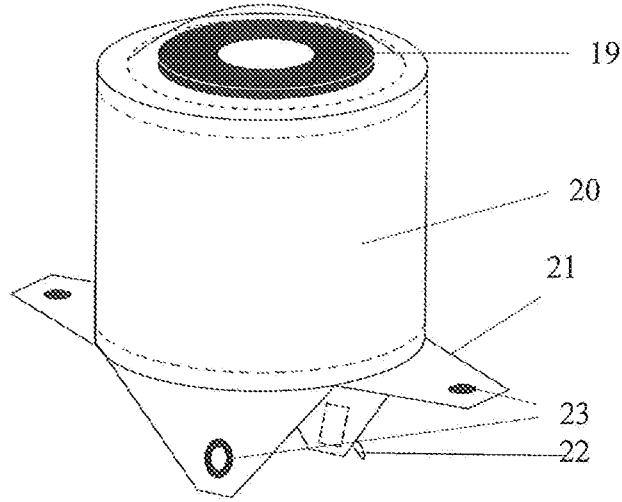
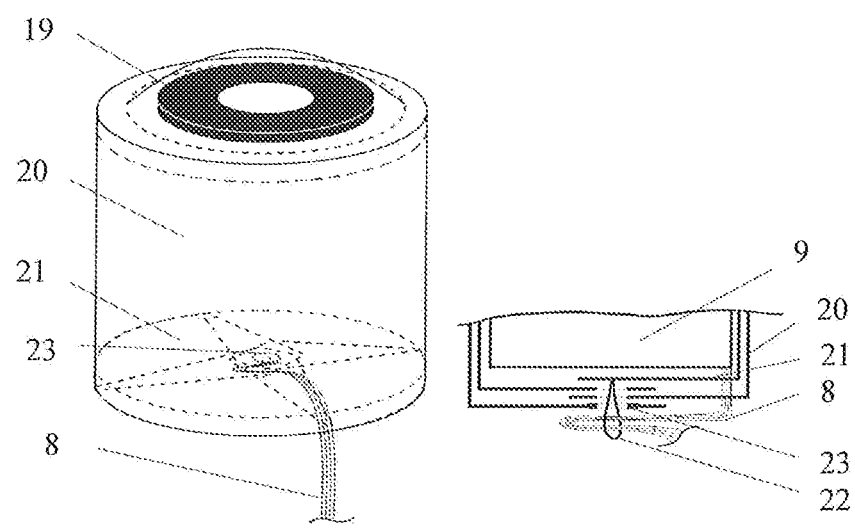
Fig. 10B  Fig. 10C

EMERGENCY PARACHUTE SYSTEM FOR RESCUE OF PERSONS, OR OF MANNED OR UNMANNED AERIAL VEHICLES

FIELD OF THE ART

The invention relates to an emergency parachute system for rescue of individuals, unmanned or manned aerial vehicles, especially in very low altitudes.

STATE OF THE ART

Emergency parachute systems for rescue of individuals are known from the prior art. The parachute is generally placed in a casing and adjusted for fastening on the back of the user. Furthermore, arrangement of main and reserve parachutes, which are adjusted for fastening on the back of a user by means of harness, is known.

Likewise, an emergency system for unmanned aerial vehicles, which is equipped with a container holding a pyrotechnic gas generator with a ejectable piston above it, is known. The space for the placement of the parachute is located above the piston. By activating the pyrotechnic gas generator, the piston along with the parachute is thrusted out of the container. The purpose of this invention is to improve the so far known solutions in a way which would allow an effective/successful use of the parachute in low altitudes above the ground.

SUMMARY OF THE INVENTION

The above stated drawbacks of prior art are to a large extent eliminated by the use of the emergency system for rescue of persons, manned or unmanned aerial vehicles as defined herein.

Such emergency parachute system for rescue of persons or of manned or unmanned aerial vehicles comprises:
a storage unit, which contains at least one cavity with an opening
at least two parachutes, each of which contains a canopy, suspension lines and a riser, while the canopies of said parachutes are folded separately and arranged in the cavity or cavities of the storage unit ejectably.

The centers of the canopies are interconnected by means of connection cords on the top side. The length of each canopy connecting cord after stretching between two canopies equals 1.1 to 1.5 times, preferably 1.15 to 1.25 times and most preferably 1.2 times the construction diameter of the canopy. In case the canopies have differing construction diameters, the length of each canopy connecting cord after stretching between two canopies equals 1.1 to 1.5 times, preferably 1.15 to 1.25 times and most preferably 1.2 times the sum of the construction radiuses of the respective pair of canopies.

According to a preferred embodiment, the emergency parachute system further comprises at least two pyrotechnic gas generators, which are arranged in the combustion chamber for ejecting the parachutes from the storage unit.

According to a preferred embodiment, the emergency parachute system further comprises a dorsal area and straps attached to the storage unit for attaching the emergency parachute system to the back of a person.

Preferably the emergency parachute system further comprises a switching unit for activation of the pyrotechnic gas generator or pyrotechnic gas generators.

The emergency parachute system may further comprise a protective casing with integrated weights, wherein the canopies of the parachutes are arranged advantageously in the protective casing and placed in the storage unit.

According to a further advantageous embodiment, the emergency parachute system further comprises at least one remotely or manually activatable rocket for lifting the storage unit with the canopies above the rescued object.

In that case it is advantageous when the storage unit is connected to the rocket by means of an extracting strap in a way that after the extracting strap is stretched, the opening for ejecting the canopy from storage unit faces away from the rocket.

Preferably, the emergency parachute system further comprises a bowl-like casing which is placed on the piston element in the storage chamber ejectably therefrom, wherein the canopies of the parachutes are partially arranged in the bowl-like casing.

Preferably, the piston element is made of plastic, preferably by press moulding, injection moulding, blow molding or casting, wherein the bowl-like casing is made of textile, most preferably non flammable textile.

BRIEF DESCRIPTION OF THE DRAWINGS

Exemplifying embodiments of the invention are schematically depicted in the drawings, wherein
FIG. 10A to FIG. 10B show an example of a protective casing for the system shown in FIG. 3A

DESCRIPTION OF EXEMPLIFYING EMBODIMENTS

Figure 1:
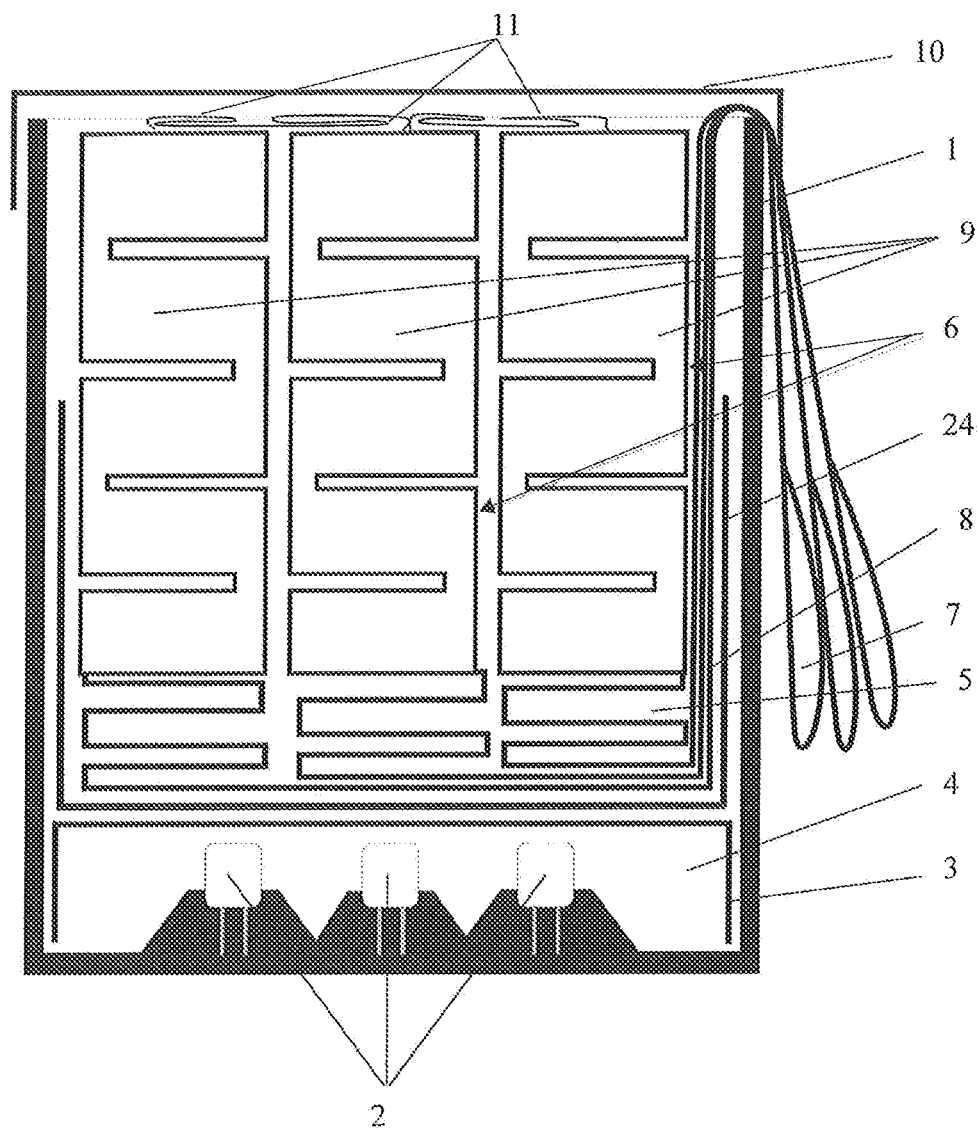
FIG. 1 shows the first embodiment of the emergency parachute system.

The first exemplifying embodiment of the emergency system schematically depicted in FIG. 1 comprises a storage unit 1 with a cavity, at the bottom of which three pyrotechnic gas generators 2 are arranged. The number of pyrotechnic gas generators 2 can be lower or higher, always according to the specifications of the particular solution.

The cavity contains also a piston element 3, which divides the opening in the storage unit 1 into a combustion chamber 4 and a storage chamber 5.

The storage chamber 5 has a cylindrical shape. It has an opening opposite to the pyrotechnic gas generators 2. The parachutes 6 can be repeatedly stored in the storage chamber 5, while the piston element 3 can be, along with the parachutes 6 stored above it, pushed through the opening from the storage unit 1, or more precisely from the storage chamber 5.

The parachute 9 with suspension lines 8 can be inserted into a protective fire-resistant bowl-like casing 24, which serves as an additional sealing of the combustion chamber 4, or rather as a protection of the parachute from possible damage caused by combustion products. The bowl-like casing 24 has a bottom, which matches the shape of the piston element 3, and sidewalls which extend adjacent to the side walls of the storage unit 5. The piston element 3 and the bowl-like casing 24 can have the same shape in a particular embodiment, in which case they are arranged co-axially in the storage unit 1 in such a way that the sidewalls of the piston element 3 extend towards the bottom of the storage unit 1 and the sidewalls of the bowl-like casing 24 extend towards the opening in the storage unit 1. The sidewalls of the bowl-like casing 24 abut the inside walls of the cavity in the storage unit 1 preferably with bigger clearance than the sidewalls of the piston element 3. The canopies 9 are only partially inserted into the bowl-like casing 24, so the bowl-like casing 24 does not affect the quickness of the release of the parachute system.

The bowl-like casing can be made, for example, from fire-resistant fabric, eventually from a fabric with a fire-resistant surface treatment.

In alternative embodiments the cavity, or rather the storage chamber 5 can have other than cylindrical cross-section, e.g. orthogonal prism. The cavity, or rather the storage chamber 5 has to be such, in all cases, to enable ejection of the piston element 3, whereas the sidewalls of the piston element 3, and eventually of the bowl-like part 24 should be at least to some extent adjacent to the side walls of the storage unit 1.

The parachute 9 comprises the canopy 9 and is equipped with a riser 7 and suspension lines 8 for connection of the canopy 9 with the riser 7. An embodiment is also possible, wherein all of the risers 7 are joined into one, so that only one riser is led out of the storage unit.

The storage unit 1 is also equipped with a cap 10, which closes the opening, of the storage chamber 5. In cases of full integration of the system into the fuselage of an aerial vehicle the cap 10 is incorporated into the outside cover of the vehicle.

In the exemplifying embodiment shown in FIG. 1, three parachutes 6 are placed into the storage chamber 5 of the storage unit 1. Each of the parachutes was individually folded and placed next to each other in the bowl-like casing 24, then inserted into the storage unit 1 to form a joint packed parachute system.

In this embodiment, the piston element 3 comprises a circular piston element and guiding sidewalls.

The pyrotechnic gas generator could be, for example, of the type described in document EP3050805B1.

The emergency parachute system contains additional parts, not shown in this Figure, especially a switching unit 16 for the activation od the emergency parachute system and an accumulator. The switching unit 16 is connected to the pyrotechnic gas generators 2 and to the electronic control panel 26 for the crew by means of activation wiring.

The riser 7 is, while in service, always directly or indirectly fixed to the object to be rescued (person or aerial vehicle).

The emergency rescue system shown in the FIG. 1 operates as follows:

Three pyrotechnic gas generators 2 are attached to the bottom of the storage unit 1. The piston element 3 is then inserted into the storage unit 1 to create the combustion chamber 4. The three parachutes 6 are folded individually and are put into the bowl-like easing 24, which is, along with the parachutes 6, inserted into the storage chamber 5 of the storage unit 1. The canopies 9 of the parachutes 6 are interconnected by connection cords 11. The opening in the storage unit 1 is closed with the cap 10. The emergency parachute system, i.e. the, storage unit 1 as well as the suspension lines 7 are fixed, for example, to an unmanned aerial vehicle, which is then used in a standard manner. In case of need, notably in case of a danger of crash of the unmanned aerial vehicle (or in the case of a planned landing sequence), the switching unit 16 is activated. The unit connects the accumulator or the power source of the aerial vehicle to the activation wiring of the pyrotechnic gas generators 2. The pyrotechnic composition in the pyrotechnic gas generators 2 is then heated up by the activation wires. This causes subsequent ignition of the pyrotechnic composition, which is followed by a generation of a relatively large volume of gas. The switching unit 16 can be set to activate all of the three pyrotechnic gas generators 2 at once or—for better distribution of the impact loading—in a rapid succession, eventually with a freely programmable sequence for successive activation of the individual pyrotechnic gas generators 2 or—when multiple parachute systems are used—for consecutive activation of the parachute systems according to particular needs.

The pressure of the gas from the pyrotechnic gas generators 2 pushes the piston element 3 rapidly towards the cap 10, while the piston element 3 pushes forward the three folded canopies 9 with the suspension lines 8 of the parachutes 6, which removes the cap 10, and the parachutes 6, originally placed in the storage chamber 5, are ejected from the storage unit 1. Thus ejected folded parachutes 6 remain fixed to the unmanned aerial vehicle by means of their suspension lines, so they ensure slowing of the fall of the unmanned aerial vehicle in such a way that the aerial vehicle does not sustain any damage upon landing.

Figure 2:
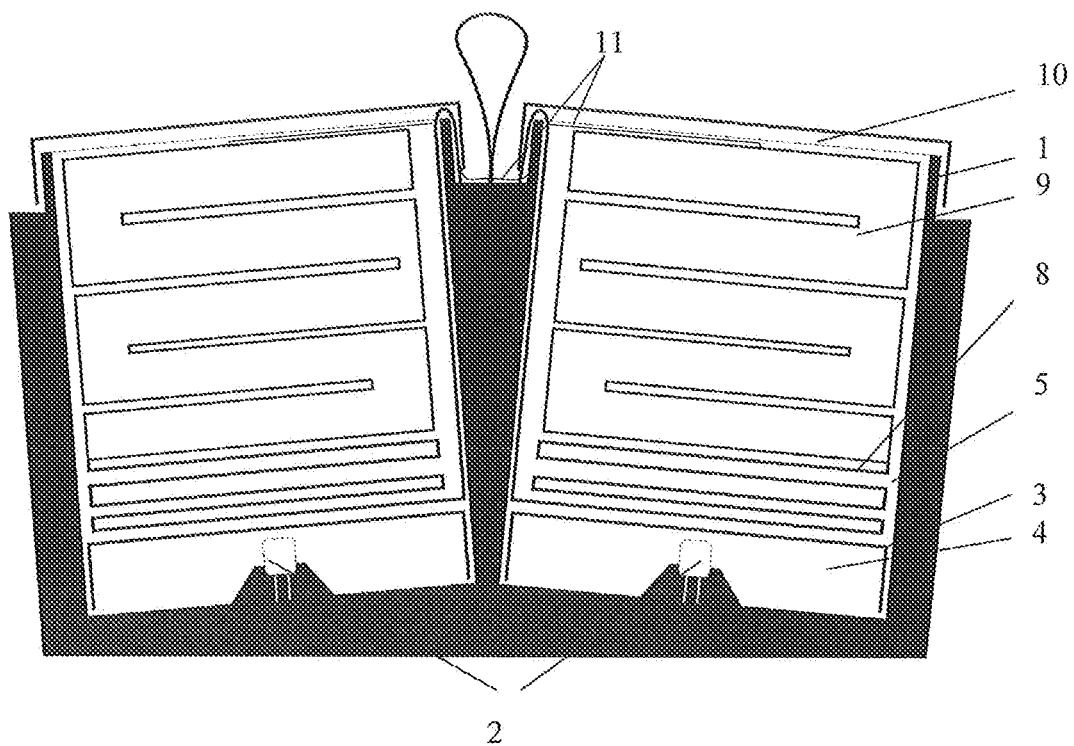
FIG. 2 shows the second embodiment.

In the embodiment shown in the FIG. 2 the storage unit 1 contains a pair of cavities. A pyrotechnic gas generator 2 and a piston element 3 dividing the cavity into a combustion chamber 4 containing a pyrotechnic gas generator 2 and a storage chamber 5 for the placement of the parachute 6 is arranged in both of them. Each one of the piston elements 3 is adapted for extension from the storage unit 1 by means of gas generation following an activation of the respective pyrotechnic gas generator 2. The canopies 9 are interconnected by the connection cords 11 again. For each canopy 9, a bowl-like casing 24 can be placed into the cavity (not shown in FIG. 2).

The axes of the ejection movement of the piston elements 3, or rather the axes of the cavities can be parallel, but preferably they are non parallel, as shown in the FIG. 3. In an especially advantageous embodiment, the axes form an angle of 2° to 30°, preferably 5° to 15°.

In a more advantageous embodiment, two (or more) pyrotechnic gas generators 2 and/or two parachutes 6 are arranged in each cavity of the storage unit 1 shown in FIG. 2.

Figure 3A:
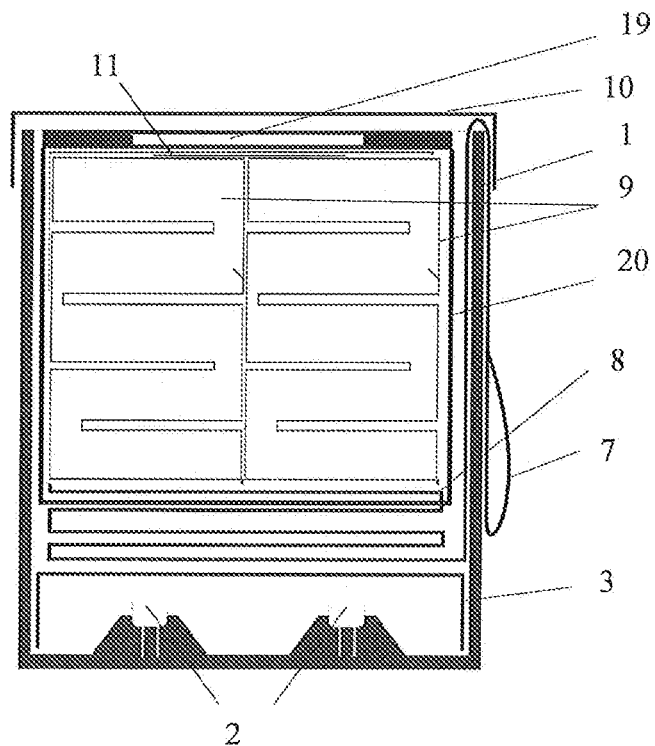
FIG. 3A shows the third embodiment prior to the activation and
FIG. 3B shortly after the activation.
Figure 3B:
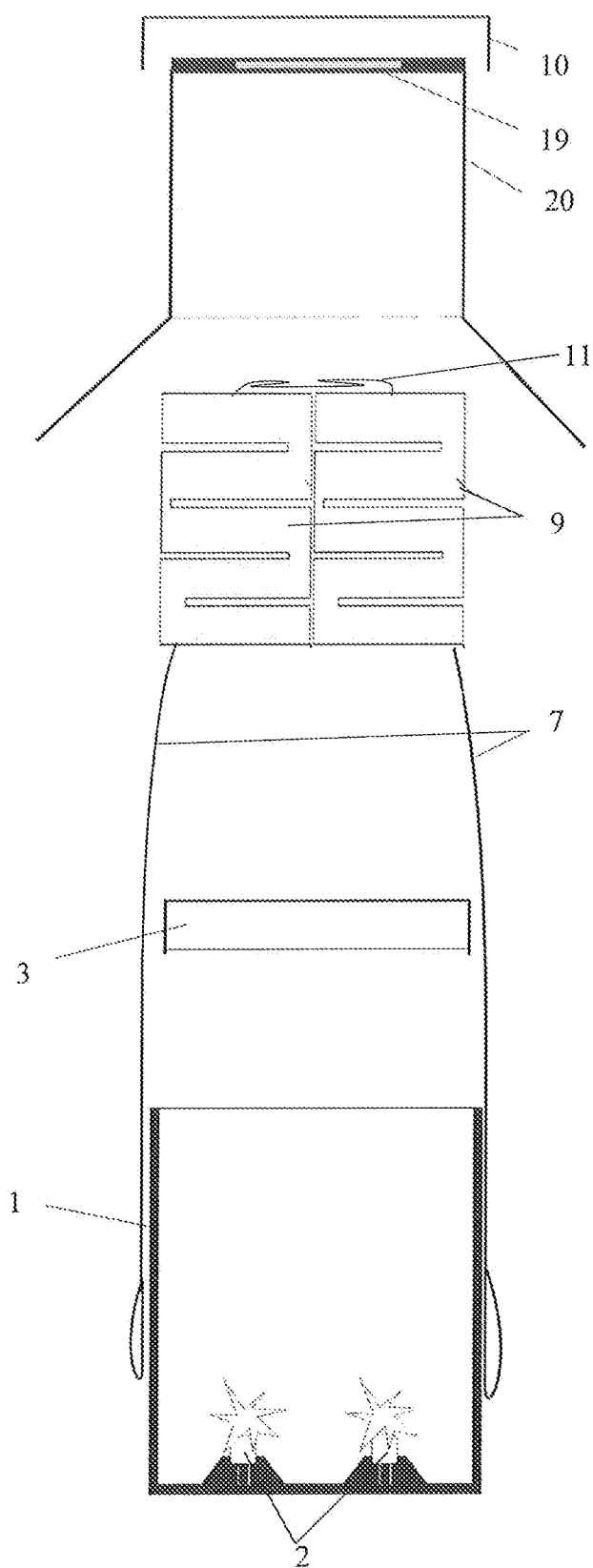

The embodiment depicted in FIG. 3A and FIG. 3B differ from the embodiment from FIG. 1 and FIG. 2 and their not-depicted alternatives especially in that the canopies 9 and eventually at least a part of suspension lines 8 are placed in a protective casing 20 with integrated weights of 10 to 500 g, preferably 10 to 100 g. The protective casing 20 is arranged preferably in such a way that the canopies 9 are placed between the weights 19 and the piston element 3. The protective casing 20 is freely removable from the folded canopies 9 after being ejected from the opening of the storage unit 1. Therefore, after the activation of the pyrotechnic gas generator 2, the piston element 3 ejects the canopies 9 in the protective casing 20 from the storage unit 1 and the canopies 9 in the protective casing 20 move away, inertially, from the storage unit 1 until the suspension lines 8 and risers 7 stretch. Then, the inertial force, or rather the kinetic energy of the weights 19 makes the protective casing 20 continue to move away from the storage unit 1, which causes its removal from the canopy 9 and removal of the canopy 9 from the protective casing 20. The release and opening of the canopy 9 thus takes place in a safe distance from the aerial vehicle. Therefore, it is exceptionally advantageous in helicopters due to lowering or eliminating the risk of entangling of the canopies 9 or other parts of the parachute 6 into the rotating parts.

Protective casing 20 can be made, for example, from fabric, preferably a fire-resistant one and the weights 19 can be sewn between two layers of the fabric, as depicted in FIG. 10A and FIG. 10B.

Two parachutes 6 are shown on the FIGS. 3A and 3B, but it is clear, that multiple parachutes 6 with joint protective casing 20 with integrated weights 19 can be used, or alternatively each one in its own protective casing 20, eventually even each one in its own protective casing 20 and placed inside a separate cavity in the storage unit 1 containing multiple cavities. The canopies 9 are interconnected by means of connecting cords 11.

Figures 4A, 4B:
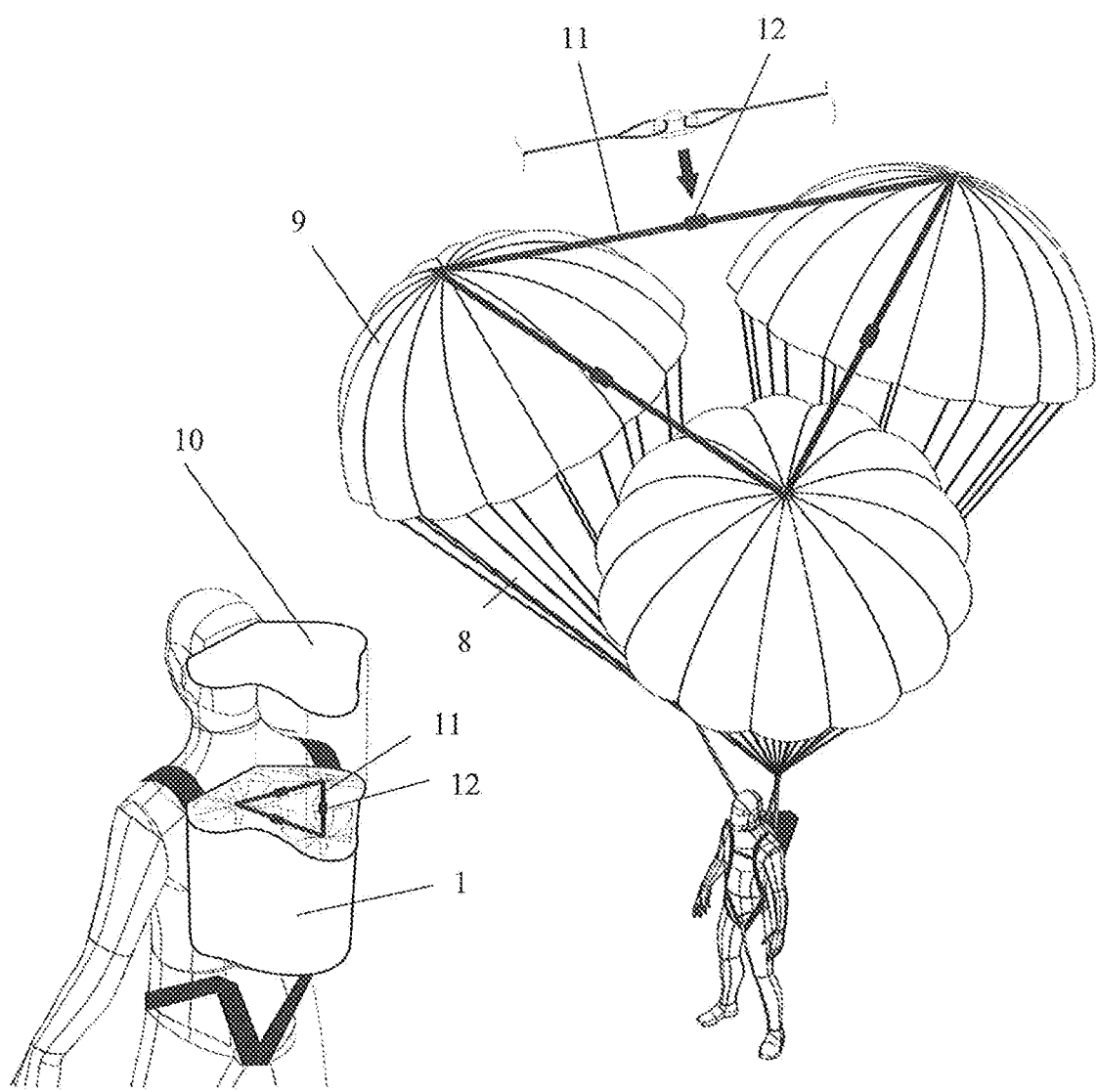
FIG. 4A shows a body with the fourth embodiment in the default state.
FIG. 4B shows a body with the fourth embodiment in activated state.

In the embodiment shown in FIGS. 4A and 4B, the storage unit 1 contains an opening with a non-circular cross-section, while 3 pyrotechnic gas generators 2 are placed, on its bottom. The storage unit 1 contains additionally the piston element 3 and three parachutes 6, or rather their canopies 9 and suspension lines 8. The piston element 3 again divides the corresponding opening to a combustion chamber 4 containing pyrotechnic gas generators 2 and a storage chamber 5 for the placement of the parachutes 6 and is again adapted to be pushed out from the cavity of the storage unit 1 in the direction of its axis by the force of gases, generated as a result of the activation of the corresponding pyrotechnic gas generators 2. The storage unit 1 then contains a dorsal area designated to be attached to the back of the user.

Alternatively, three cavities can be used. The cavities can again be non-parallel and form an angle of 2° to 30°, preferably 5° to 15°. Two cavities of the storage unit 1 are arranged preferably along the dorsal area, forming an angle of 5° to 20° with that surface. In an advantageous embodiment, the centers of the openings of the cavities form apexes of an equilateral triangle.

Simultaneously, the emergency parachute system as shown in FIGS. 4A and 4B can be equipped with straps which allow attachment of the storage unit 1 to the back of the user.

The firing electronics, or rather the switching unit 16 and the battery are, advantageously, arranged in or on the bottom part of the storage unit 1, thus they form an integral or removable part of the storage unit 1 on the side opposite to the caps 10 of the cavities.

Activation of the switching unit 16 can be done manually, by pulling out a safety plug, electronically by pushing the button connected with the switching unit 16, or automatically on the basis of the evaluation of the signals from the sensors connected to the switching unit 16.

The emergency parachute system also contains canopy connecting cords 11, which interconnect the apexes of the canopies 9 in order to stabilize the system of the canopies 9 during the flight. In this embodiment, each of the parachutes 6 is equipped with two canopy connecting cords 11 (or rather partial connecting cords in a number matching the number of the other parachutes 6 in the corresponding parachute system), while these canopy connecting cords 11 are, each by one of their ends, fixed to the apex of the canopy 9 of the corresponding parachute 6 and are equipped with a connecting device at the other end, in this embodiment, the connecting device comprises a snap hook and an eye. The snap hook connects the eyes of two canopy connecting cords 11 of two adjacent parachutes 6. The total of the lengths of the two thus connected canopy connecting cords 11 of two adjacent parachutes 6 equals the maximum required distance of the apexes of the canopies 9 in service. The total length of the connecting cords 11 between the canopies preferably equals 1.1 to 1.5 times, better 1.15 to 1.25 times and preferably 1.2 times the construction diameter of the canopy 9, while all of the canopies 9 in a single storage unit preferably have the same diameter and also the same length of the suspension lines 8 with the riser 7.

However, the connecting device is not required if the canopy connecting cords 11 have the full length corresponding to the maximum required mutual distance of the apexes of the canopies 9 in service and each of the canopy connecting cords 11 is fixed to the apex of a canopy 9 of a parachute 6 with one end and to the apex of a canopy 9 of another parachute 6 with the other end. Nonetheless, the above described split embodiment of the canopy connecting cords 11 with the connecting sets 12 allows each cavity or section of the storage unit 1 to be prepared/loaded independently, and eventually it allows each parachute to be prepared independently, while larger part of the canopy connecting rods 11, which are fixed to a single canopy 9, is rolled up/folded and placed into the cavity of the storage unit 1 (preferably just under the cap 10) and only a smaller part with the eye is left outside the cavity. When all of the cavities are loaded, two eyes are always connected by the snap hook (or other suitable connecting device) as depicted in FIG. 4A, eventually in detail of FIG. 4B. After ejecting of the parachutes 6 the canopy connecting cords 11 stretch, as shown in FIG. 4B and thus delimit the maximum mutual distance of the canopies 9. In the embodiment, shown in FIGS. 4A and 4B, favourable number of parachutes is 2 to 4.

Figure 5:
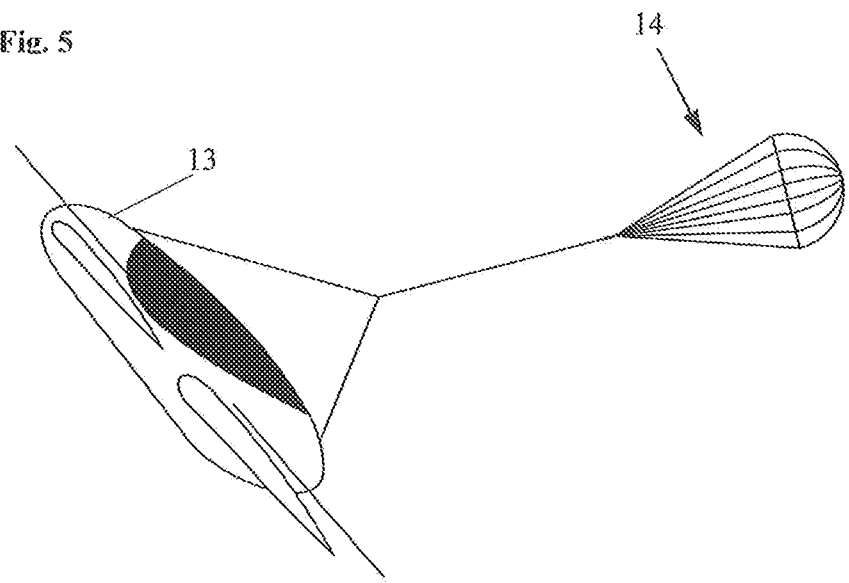
FIG. 5 shows the fifth embodiment after the activation of the parachute brake.

FIG. 5 shows a manned aerial vehicle—aircraft 13, in which the parachute brake 14 for slowing the forward movement of the aircraft 13 was first activated after the activation of the emergency system. In case of risk of a crash in high forward speed of the aircraft 13, the parachute brake is activated first. The emergency parachute systems on the wings of the aircraft 13 are activated only after the speed is lowered. The way, in which the parachute brake 14 is attached to the center of gravity of the aircraft 13, ensures optimal adjustment of the position of the vehicle during the braking phase in a way that the vehicle is slowed by the drag force as much as possible. A more effective and shorter braking time is thus ensured. The parachute brake 14 can be discarded before the activation of the main parachute system, eventually the discard of the parachute brake can be used for releasing the next parachute system (such as another parachute brake in case the deceleration is achieved by two, successively activated, parachute brakes).

Figure 6:
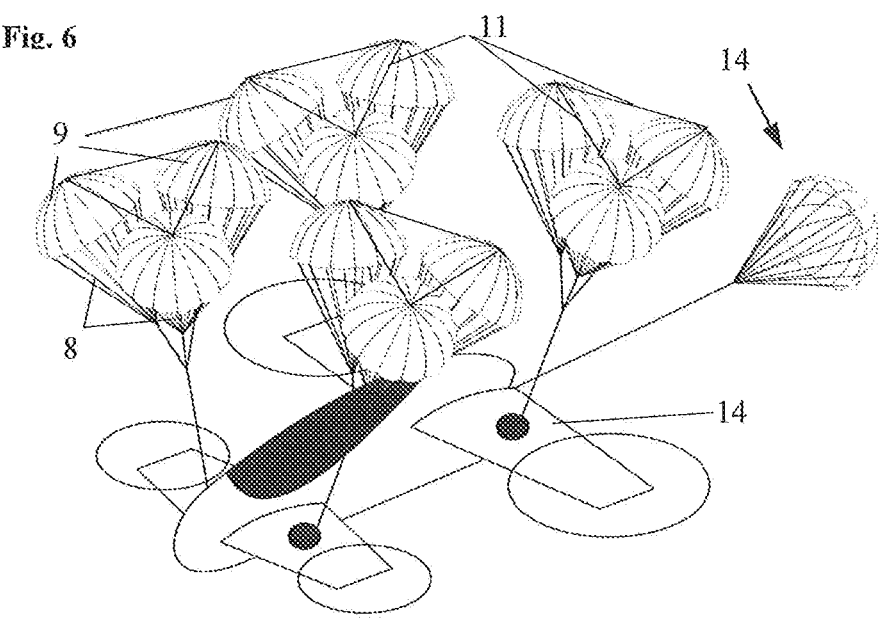
FIG. 6 shows the fifth embodiment after the activation of the emergency system according to the invention,
FIG. 7 indicates connection of the switching unit.

FIG. 6 depicts the aircraft from FIG. 5 after the activation of the emergency parachute systems according to the invention, more precisely a system of 4 emergency parachute systems placed on the aircraft 13. An emergency parachute system as shown in FIG. 1 or 2 is fixed to each of the four wings of the aircraft 13, whereas all these systems are electrically connected in order to coordinate their activation, or they can be activated remotely. The switching unit 16 can be further equipped with an autonomous system, which, according to the current state of the flight of the aircraft 13 (current altitude, speed) evaluates the situation and commences an ideal emergency sequence, leading to as short rescue time as possible. For example, if the speed is exceeding 80 km/h, the unit first activates the emergency brake 14 (FIG. 5), which, for the time based on the current speed in the moment when the sequence is launched, slows the aerial vehicle to the speed, which enables the activation of the main multi-parachute system (FIG. 6). This system can be further equipped with another elements of passive safety, such as bottom airbags or designated crumple zones, serving to lower the impact energy. These elements can be operated by a single electronical unit, which can launch the system with pyrotechnic gas generators as well as the system with rocket engines.

(The storage unit 1 is not depicted on FIG. 5 to 8C, its position is only indicated by a dark circle). In the embodiment shown in FIG. 7, the emergency systems are fixed to the fuselage of the aircraft 13 (manned or unmanned). In this exemplifying embodiment, one emergency system is located on the front part and another on the rear part of the airplane.

Figure 7:
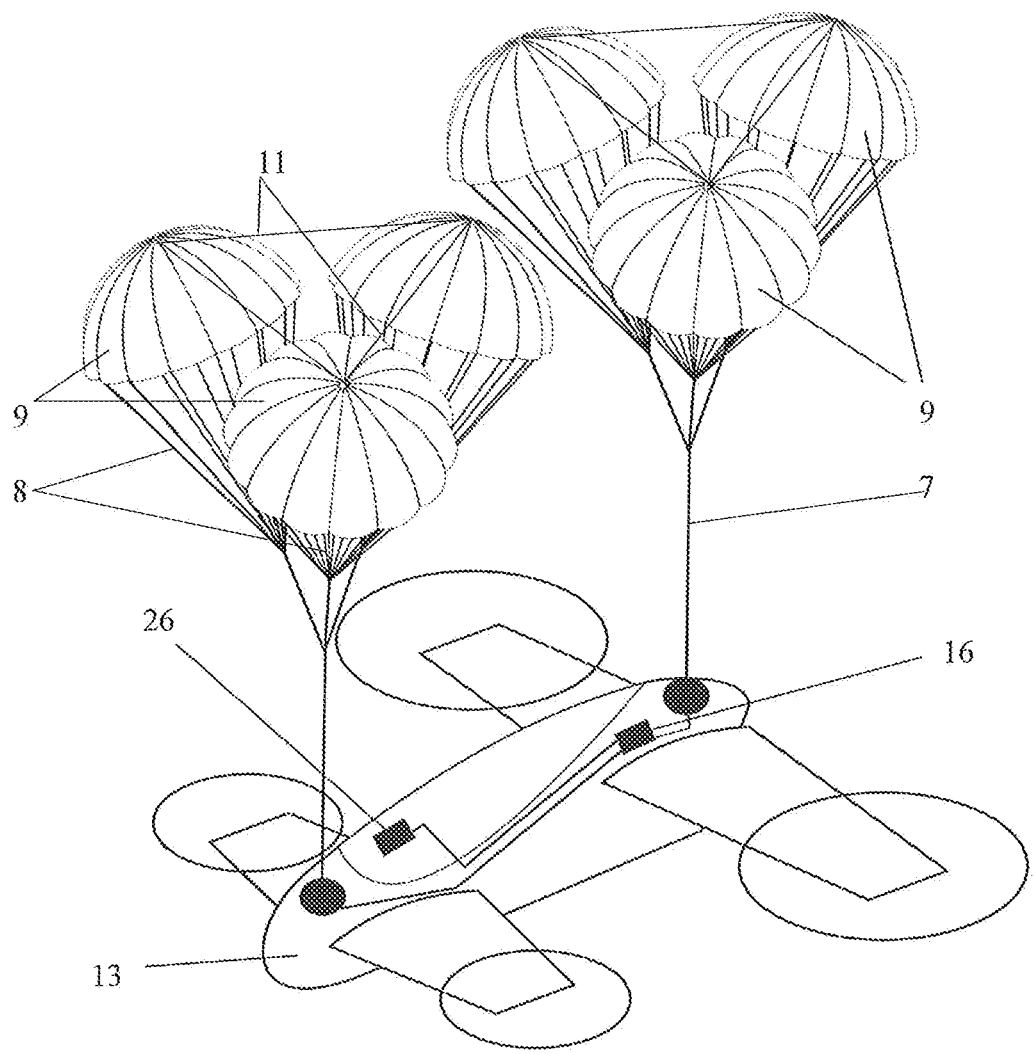
Figure 8A:
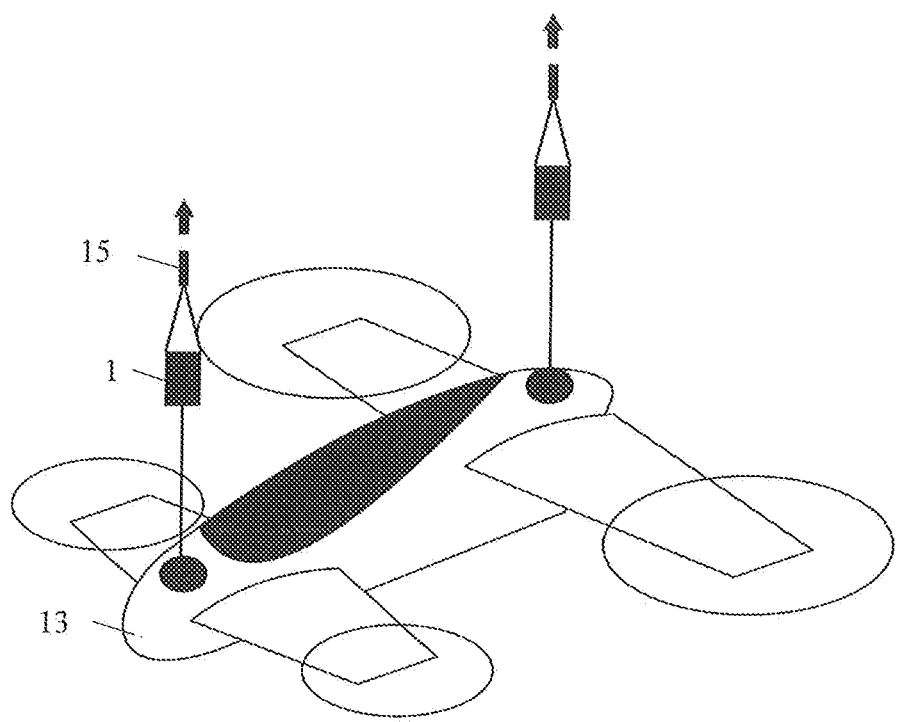
FIG. 8A to FIG. 8C show the sixth embodiment in separate, consecutive steps of the activation.
Figure 8B:
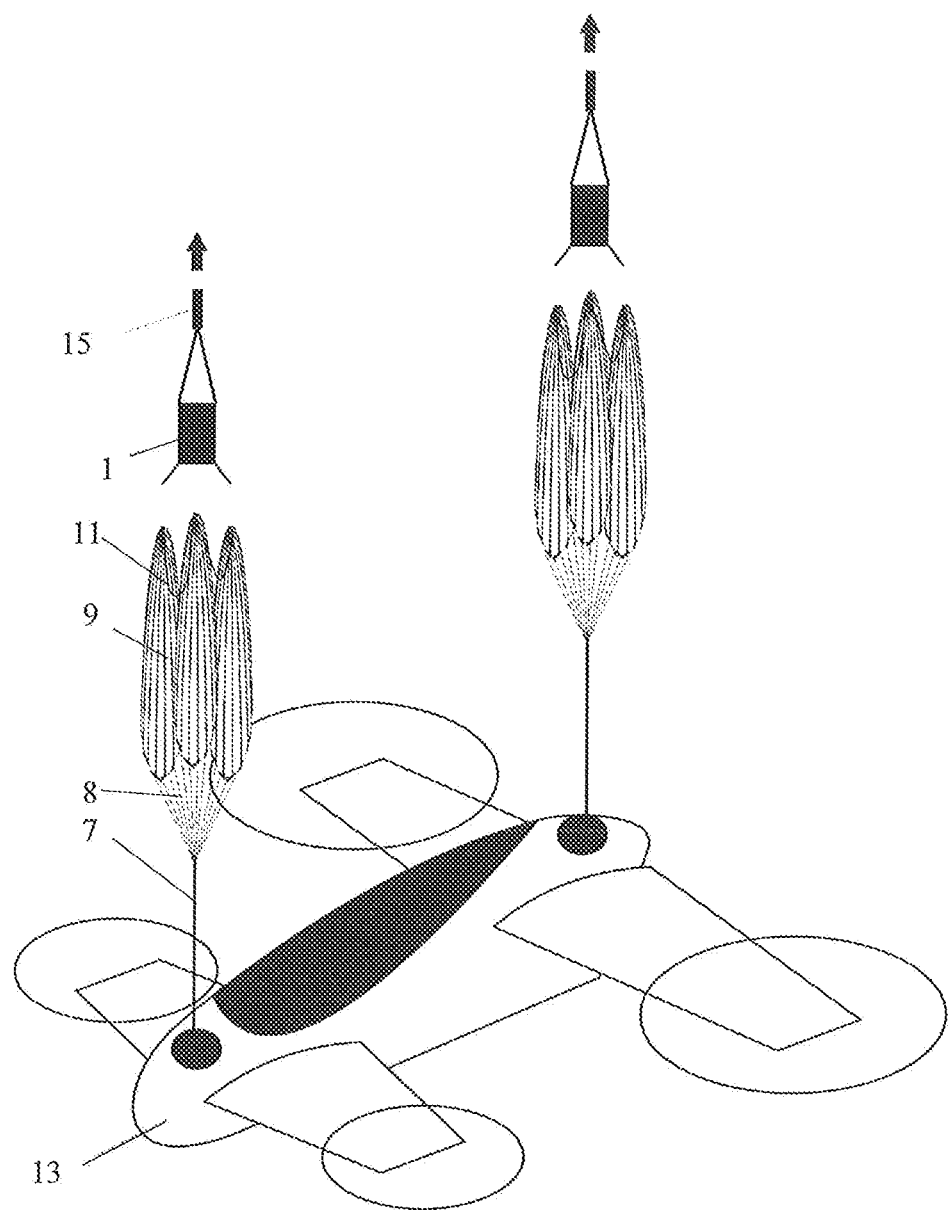
Figure 8C:
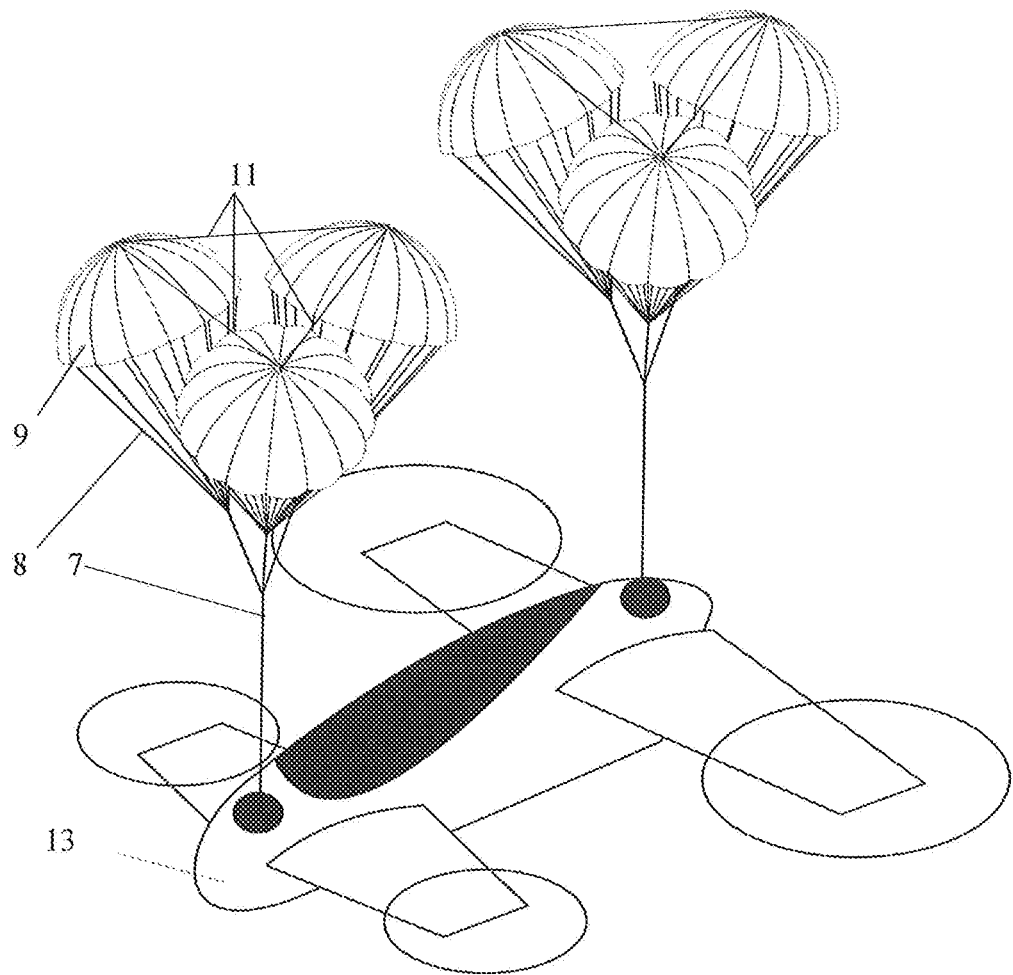

FIG. 8A to 8C depict another exemplifying embodiment in various phases of activation. This embodiment differs from the embodiment shown in FIG. 7 in that each of the emergency parachute systems is equipped with a rocket 15 for ejecting the corresponding parachute system 6. The opening of the storage unit 1 for storing or releasing the parachute 6 faces the aircraft 13, while on the opposite (top) side a rocket 1 is attached to it. The parachute 6 is attached to the aircraft 13 by the riser 7. The rocket 15 is activated by activation of the emergency parachute system. The rocket 15 then pulls the storage unit 1 along with the parachute 6 above the aircraft 13 and after the riser 7 is completely stretched, a safety lock is released. The canopies 9 and suspension lines 8 are then pulled out from the storage unit 1 and the release of the parachutes 6 takes place.

For better distribution of loading, the riser 7 can be further equipped with a system of spreading straps (not shown), which are attached to the riser 7 by one end and to the aircraft by the other, at several spaced apart locations.

For example, the embodiment shown in FIG. 7 would be altered in such a way that the parachute system attached to the front part of the fuselage would be attached to the two wings in the front part of the aircraft by means of the spreading straps system. The parachute system, originally placed in the rear part of the fuselage would be attached to the two wings in the rear part of the aircraft 13 by means of suspension lines instead. The embodiment shown in FIG. 8A to 8C could be altered in a similar way.

Figures 9A, 9B:
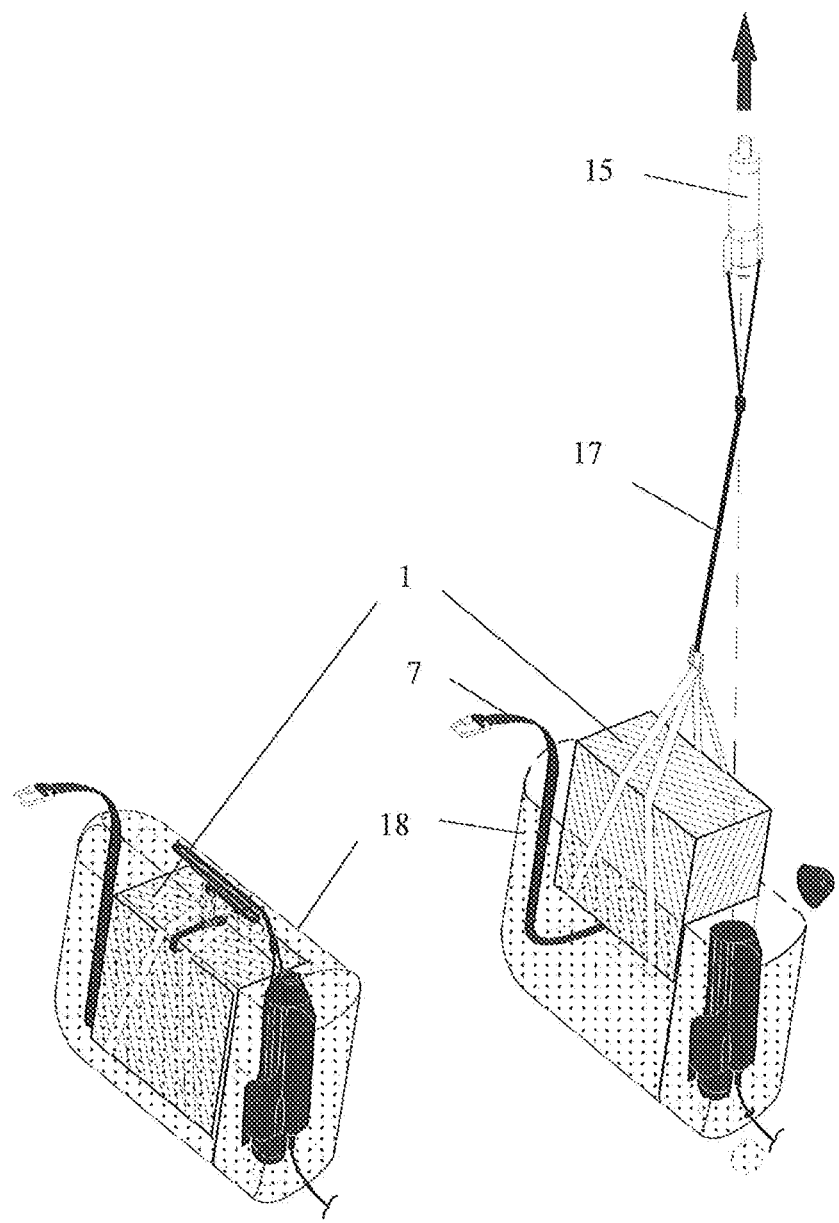
FIG. 9A and FIG. 9B show the exemplifying embodiment of the assembly of the storage unit and the rocket as shown in FIG. 8A to FIG. 8C both prior and shortly after the activation.

FIGS. 9A and 9B show a schematic, but more detailed depiction of such system, wherein an outer casing 18 is shown, which is fixable to the aircraft 13 and in which a storage unit 1 and a rocket 15 is placed. At least two parachutes 6 are arranged in the storage unit 1. Their risers 7 are directly or indirectly fixable to the aircraft 13. Simultaneously, the storage unit 1 is connected to the rocket 15 by means of extracting strap 17.

The rocket 15 is connected to a switching unit (not shown) and is arranged in the outer casing 18 in a way that it may start to move out from the outer casing 18 after the activation, pull out the storage unit 1 from the outer casing 18 by means of extracting strap 17, stretch the riser 7 while rising and, by rising further, removing the storage unit 1 from the folded canopies 9, thus allowing it to unroll.

The rocket 15 can be activated remotely or manually (through wiring). This embodiment, which does not include a pyrotechnic gas generator 2, is exceptionally advantageous in case of large total weight of parachutes in the emergency parachute system.

FIG. 10A to 10C show a detailed exemplifying embodiment of the protective casing 20 from FIG. 3A. The depicted protective casing 20 is made from fabric, alternatively a plastic film or other plastic material (eventually net) can be used. The depicted protective casing 20 has a cylindrical shape, but other embodiments are possible as well. The protective casing 20 has weights 19 sewn-in in one of its ends, here in the form of a metal ring. On the other end the protective casing 20 has an opening, which can be closed by a number of, in this case four, flaps 21, which are fixed to the walls of the protective casing 20 and are tiltable towards the plane of the insertion opening in such a way that their free ends overlap. One of the flaps 21 is equipped with an eye 22 on its free end, while the other flaps 21 are, on their free ends, equipped with through-holes 23, through which the eye 22 can be led.

The canopy 9, and eventually a part of suspension lines 8 (which are led out of the protective casing 20 between two neighboring flaps 21) is inserted into the protective casing 20. The flaps 21 are tilted towards the center axis of the protective casing 20, thus closing the protective casing 20. The eye 22 is pulled through the straight-through openings 23 of the flaps 21. During the placing of thus loaded protective casing 20 into the cavity of the storage unit 1 (the weights 19 upwards and the flaps 21 downwards), a convolution forms on the suspension lines 8, which is then pulled through the eye 22 and thus fixes the flaps 21 in tilted position. After the activation of the emergency system the suspension lines 8 stretch, thus pulling the convolution from the eye 22. The through holes 23 of the flaps 21 can therefore be moved from the eye 22, so that the flaps may tilt off. Once the suspension lines 8 and the riser 7 are stretched, the protective casing continues to move away from the storage unit 1 due to the kinetic energy of the weights 19, which causes the protective casing to be removed from the canopy 9.

Although especially advantageous embodiments have been described, it is clear that an expert in the field could easily find other possible alternatives to these embodiments or combinations of these embodiments. The scope of protection is therefore not limited to these exemplifying embodiments, but it is determined by the definitions of the appended patent claims.

The invention claimed is:

1. An emergency parachute system for rescue of persons or of manned or unmanned aerial vehicles comprising:
   a storage unit, which contains at least one cavity with an opening,
   at least two parachutes, each of which contains a canopy, suspension lines, and a riser, wherein the canopies of the at least two parachutes are folded separately and arranged in the at least one cavity of the storage unit ejectably,
   a piston element which is placed in the at least one cavity ejectably and which divides the at least one cavity in the storage unit into a combustion chamber and a storage chamber;
   at least two pyrotechnic gas generators which are placed in the combustion chamber, for ejecting the at least two parachutes from the storage unit; and wherein the centers of the canopies are mutually interconnected by means of connection cords on the top side in order to stabilize the system during flight.

2. The emergency parachute system according to claim 1, further comprising a switching unit for activating at least one of the at least two pyrotechnic gas generator or pyrotechnic gas generators.

3. The emergency parachute system according to claim 1, wherein the canopies of the at least two parachutes are placed in a single cavity of the storage unit next to each other.

4. The emergency parachute system according to claim 1, further comprising a bowl-like casing which is placed on the piston element in the storage chamber ejectably therefrom, wherein the canopies of the at least two parachutes are partially arranged in the bowl-like casing.

5. The emergency parachute system according to claim 4, wherein the bowl-like casing has sidewalls, which are adjacent to the inside walls of the storage chamber with a clearance.

6. An emergency parachute system for rescue of persons or of manned or unmanned aerial vehicles comprising:
   a storage unit, which contains at least one cavity with an opening, and
   at least two parachutes, each of which contains a canopy, suspension lines, and a riser, wherein the canopies of the at least two parachutes are folded separately and arranged in the at least one cavity of the storage unit ejectably,
   wherein the centers of the canopies are mutually interconnected by means of connection cords on the top side in order to stabilize the system during flight, and
   wherein the at least one cavity includes at least two cavities, wherein each of the at least two cavities contains at least two canopies with suspension lines and at least one pyrotechnic gas generator and a piston element is placed between the at least two canopies, the piston element being arranged for ejecting the canopies with the suspension lines from the cavity of the storage unit by the force of the gas from the pyrotechnic gas generator on the piston element, while all of the canopies or at least those placed in the joint cavity are interconnected by the connecting cords.

7. The emergency parachute system according to claim 6, further comprising a dorsal area and straps attached to the storage unit for attaching the emergency parachute system to the back of a person, while the axes of the cavities in the storage unit form an angle of 0° to 15°.

8. The emergency parachute system according to claim 1, further comprising a protective casing with integrated weights, wherein the canopies of the parachutes are arranged in the protective casing and placed in the storage unit.

9. An emergency parachute system for rescue of persons or of manned or unmanned aerial vehicles comprising:
   a storage unit, which contains at least one cavity with an opening,
   at least two parachutes, each of which contains a canopy, suspension lines, and a riser, wherein the canopies of the at least two parachutes are folded separately and arranged in the at least one cavity of the storage unit ejectably,
   at least one remotely or manually activatable rocket for lifting the storage unit with the canopies above the rescued object, and
   wherein the centers of the canopies are mutually interconnected by means of connection cords on the top side in order to stabilize the system during flight.

10. The emergency parachute system according to claim 9, wherein the storage unit is connected to the rocket by means of an extracting strap in a way that after the extracting strap is stretched, the opening for ejecting the canopy from the storage unit faces away from the rocket.

11. An emergency parachute system for rescue of persons or of manned or unmanned aerial vehicles comprising:
    a storage unit, which contains at least one cavity with an opening,
    at least two parachutes, each of which contains a canopy, suspension lines, and a riser, wherein the canopies of the at least two parachutes are folded separately and arranged in the at least one cavity of the storage unit ejectably,
    wherein the centers of the canopies are mutually interconnected by means of connection cords on the top side in order to stabilize the system during flight, and
    wherein N canopy connecting cords are attached to each canopy, while N is the number of parachutes placed in the storage unit minus 1.

12. The emergency parachute system according to claim 1, wherein the number of parachutes in the storage unit is 2 to 5.

13. The emergency parachute system according to claim 1, wherein the length of each canopy connecting cord after stretching between two canopies equals 1.1 to 1.5 times the diameter of the canopy.

14. The emergency parachute system according to claim 13, wherein each of the canopy connecting cords is made up by two partial cords, each of which has a first end attached to one of the canopies and a second end attached to another partial cord by means of a connecting device.

15. The emergency parachute system according to claim 1, wherein all of the canopies in the storage unit have the same diameter and/or the same maximum distance of the canopy from the storage unit once the suspension lines and the riser are stretched and the canopy is opened.

* * * * *